(12) United States Patent
Du

(10) Patent No.: US 10,853,623 B2
(45) Date of Patent: Dec. 1, 2020

(54) METHOD AND APPARATUS FOR GENERATING INFORMATION

(71) Applicant: Baidu Online Network Technology (Beijing) Co., Ltd., Beijing (CN)

(72) Inventor: Kang Du, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 42 days.

(21) Appl. No.: 16/052,405

(22) Filed: Aug. 1, 2018

(65) Prior Publication Data

US 2019/0102605 A1  Apr. 4, 2019

(30) Foreign Application Priority Data

Sep. 29, 2017  (CN) .......................... 2017 1 0911147

(51) Int. Cl.
*G06K 9/00* (2006.01)
*G06K 9/20* (2006.01)
(Continued)

(52) U.S. Cl.
CPC ..... *G06K 9/00255* (2013.01); *G06K 9/00268* (2013.01); *G06K 9/00288* (2013.01);
(Continued)

(58) Field of Classification Search
CPC ........... G06K 9/00255; G06K 9/00268; G06K 9/00288; G06K 9/2054; G06K 9/4628; G06K 9/6257; G06K 9/6274; G06K 9/6277; G06N 3/0454; G06N 3/08; G06N 3/084; G06N 7/005
See application file for complete search history.

(56) References Cited

U.S. PATENT DOCUMENTS 8,027,521 B1 * 9/2011 Moon ................ G06K 9/00288
382/118
2016/0148080 A1 * 5/2016 Yoo ..................... G06K 9/4628
382/157

(Continued)

FOREIGN PATENT DOCUMENTS

CN  105868797 A  8/2016
CN  106469298 A  3/2017

*Primary Examiner* — Zhitong Chen
(74) *Attorney, Agent, or Firm* — Seed IP Law Group LLP

(57) ABSTRACT

A method and an apparatus for generating information are provided. The method comprises: acquiring a to-be-detected image and facial region information used to indicate a facial region in the to-be-detected image and obtained by previously performing face detection on the to-be-detected image; extracting a facial image from the to-be-detected image based on the facial region information; inputting the facial image into a pre-trained convolutional neural network to obtain image feature information, the convolutional neural network being used to extract an image feature; analyzing the image feature information to determine a probability of each pixel point included in the facial image belonging to a category indicated by each category identifier in a preset category identifier set; and generating information for indicating the category to which the each pixel point belongs based on the probability. This embodiment implements generation of information full of pertinence.

16 Claims, 6 Drawing Sheets

(51) Int. Cl.
*G06N 3/08* (2006.01)
*G06N 7/00* (2006.01)
*G06K 9/62* (2006.01)
*G06N 3/04* (2006.01)
*G06K 9/46* (2006.01)

(52) U.S. Cl.
CPC ......... *G06K 9/2054* (2013.01); *G06K 9/4628* (2013.01); *G06K 9/6257* (2013.01); *G06K 9/6274* (2013.01); *G06K 9/6277* (2013.01); *G06N 3/0454* (2013.01); *G06N 3/08* (2013.01); *G06N 3/084* (2013.01); *G06N 7/005* (2013.01)

(56) References Cited

U.S. PATENT DOCUMENTS

2018/0289334 A1* 10/2018 De Brouwer .......... G16H 50/30
2019/0080456 A1* 3/2019 Song ........................ G06T 7/12

* cited by examiner

METHOD AND APPARATUS FOR GENERATING INFORMATION

CROSS-REFERENCE TO RELATED APPLICATION

This application claims the priority of Chinese Application No. 201710911147.X, filed on Sep. 29, 2017, entitled "Method and Apparatus for Generating Information," the entire disclosure of which is incorporated herein by reference.

TECHNICAL FIELD

The present disclosure relates to the field of computer technology, specifically to the field of Internet technology, and more specifically to a method and apparatus for generating information.

BACKGROUND

Face recognition has various application scenarios, for example, face payment, face verification and face beautification. How to detect an image including a human face to generate information facilitating the face recognition (for example, a position of the human face may be quickly determined based on the information) before performing the face recognition, so as to improve the facial recognition efficiency, is a problem worthy of study.

SUMMARY

An objective of the embodiments of the present disclosure is to provide a method and apparatus for generating information.

In a first aspect, the embodiments of present disclosure provide a method for generating information. The method includes: acquiring a to-be-detected image and facial region information used to indicate a facial region in the to-be-detected image and obtained by previously performing a face detection on the to-be-detected image; extracting a facial image from the to-be-detected image based on the facial region information; inputting the facial image into a pre-trained convolutional neural network to obtain image feature information, the convolutional neural network being used to extract an image feature; analyzing the image feature information to determine a probability of each pixel point included in the facial image belonging to a category indicated by each category identifier in a preset category identifier set; and generating information for indicating the category to which each pixel point belongs based on the probability.

In some embodiments, the analyzing the image feature information to determine a probability of each pixel point included in the facial image belonging to a category indicated by each category identifier in a preset category identifier set includes: inputting the image feature information into a pre-trained probability calculation model to obtain the probability of each pixel point included in the facial image belonging to the category indicated by each category identifier in the category identifier set. The probability calculation model is used to represent a correspondence between the image feature information of the image including a human face and the probability of the pixel point belonging to each category identifier in the category identifier set.

In some embodiments, the convolutional neural network and the probability calculation model are trained and obtained through following training: extracting a preset training sample including a sample image displaying the human face and an annotation of the sample image, where the annotation includes a data marker for representing whether each pixel point in the sample image belongs to each category identifier in the category identifier set; and training and obtaining the convolutional neural network and the probability calculation model based on the training sample, a preset classification loss function and a back propagation algorithm by using a machine learning method, where the classification loss function is used to represent a degree of difference between the probability outputted by the probability calculation model and the data marker included in the annotation.

In some embodiments, the convolutional neural network includes 5 convolutional layers and 5 deconvolutional layers. The convolutional layers are used to perform a downsampling operation on the inputted information, and the deconvolutional layers are used to perform an upsampling operation on the inputted information.

In some embodiments, the generating information for indicating the category to which each pixel point belongs based on the probability includes: determining, for each pixel point included in the facial image, a category indicated by a category identifier corresponding to a maximum probability corresponding to the pixel point as the category to which the pixel point belongs; and generating a matrix identical in size to the facial image. Each element in the matrix is a category identifier of a category to which a pixel point whose position in the facial image is the same as the position of the element in the matrix belongs.

In some embodiments, the extracting a facial image from the to-be-detected image based on the facial region information includes: expanding a range of the facial region indicated by the facial region information to obtain a first facial region; and capturing the first facial region to obtain the facial image.

In some embodiments, the facial region is a rectangular region. The expanding a range of the facial region indicated by the facial region information includes: expanding a height and a width of the facial region indicated by the facial region information by a preset multiple or increasing the height and the width by a preset numerical value.

In a second aspect, the embodiments of the present disclosure provide an apparatus for generating information. The apparatus includes: an acquiring unit, configured to acquire a to-be-detected image and facial region information used to indicate a facial region in the to-be-detected image and obtained by previously performing a face detection on the to-be-detected image; an extracting unit, configured to extract a facial image from the to-be-detected image based on the facial region information; an inputting unit, configured to input the facial image into a pre-trained convolutional neural network to obtain image feature information, the convolutional neural network being used to extract an image feature; a determining unit, configured to analyze the image feature information to determine a probability of each pixel point included in the facial image belonging to a category indicated by each category identifier in a preset category identifier set; and a generating unit, configured to generate information for indicating the category to which each pixel point belongs based on the probability.

In some embodiments, the determining unit includes: an inputting subunit, configured to input the image feature information into a pre-trained probability calculation model to obtain the probability of each pixel point included in the facial image belonging to the category indicated by each category identifier in the category identifier set. The probability calculation model is used to represent a correspondence between the image feature information of the image including a human face and the probability of the pixel point belonging to each category identifier in the category identifier set.

In some embodiments, the convolutional neural network and the probability calculation model are trained and obtained through following training: extracting a preset training sample including a sample image displaying the human face and an annotation of the sample image, where the annotation includes a data marker for representing whether each pixel point in the sample image belongs to each category identifier in the preset category identifier set; and training and obtaining the convolutional neural network and the probability calculation model based on the training sample, a preset classification loss function and a back propagation algorithm by using a machine learning method. The classification loss function is used to represent a degree of difference between the probability outputted by the probability calculation model and the data marker included in the annotation.

In some embodiments, the convolutional neural network includes 5 convolutional layers and 5 deconvolutional layers. The convolutional layers are used to perform a down-sampling operation on the inputted information, and the deconvolutional layers are used to perform an upsampling operation on the inputted information.

In some embodiments, the generating unit includes: a determining subunit, configured to determine, for each pixel point included in the facial image, a category indicated by a category identifier corresponding to a maximum probability corresponding to the pixel point as the category to which the pixel point belongs; and a generating subunit, configured to generate a matrix identical in size to the facial image. Each element in the matrix is a category identifier of a category to which a pixel point whose position in the facial image is the same as a position of the element in the matrix belongs.

In some embodiments, the extracting unit includes: an expanding subunit, configured to expand a range of the facial region indicated by the facial region information to obtain a first facial region; and an capturing subunit, configured to capture the first facial region to obtain the facial image.

In some embodiments, the facial region is a rectangular region. The expanding subunit includes: an expanding module, configured to expand a height and a width of the facial region indicated by the facial region information by a preset multiple or increase the height and the width by a preset numerical value.

In a third aspect, the embodiments of the present provide an electronic device. The electronic device includes: one or more processors; and a storage device, configured to store one or more programs. The one or more programs, when executed by the one or more processors, cause the one or more processors to implement the method described in any implementation in the first aspect.

In a fourth aspect, the embodiments of the present provide a computer readable storage medium storing a computer program. The program, when executed by a processor, implements the method described in any implementation in the first aspect.

According to the method and apparatus for generating information provided by the embodiments of the present disclosure, by acquiring the to-be-detected image and the facial region information used to indicate the facial region in the to-be-detected image and obtained by previously performing the face detection on the to-be-detected image, the facial image is extracted from the to-be-detected image based on the facial region information. Then, the facial image is inputted into the pre-trained convolutional neural network to obtain the image feature information. Next, by analyzing the image feature information, the probability of each pixel point included in the facial image belonging to the category indicated by each category identifier in the preset category identifier set may be determined. Finally, the information for indicating the category to which each pixel point belongs may be generated based on the probability. Accordingly, the image feature information of the facial image is determined by effectively using the pre-trained convolutional neural network, and the probability of each pixel point included in the facial image belonging to the category indicated by each category identifier in the category identifier set is determined based on the image feature information, thereby implementing the generation of the information full of pertinence.

Moreover, the detection range may be narrowed by extracting the facial image from the to-be-detected image, thereby improving the image detection efficiency. In addition, the generated information for indicating the category to which each pixel point included in the facial image belongs may be used in the facial recognition process. Based on the category (e.g., left eye, right eye, upper lip, and lower lip) to which each pixel point belongs, different parts of the human face can be quickly recognized, which may be helpful to improve the facial recognition efficiency.

BRIEF DESCRIPTION OF THE DRAWINGS

After reading detailed descriptions of non-limiting embodiments given with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
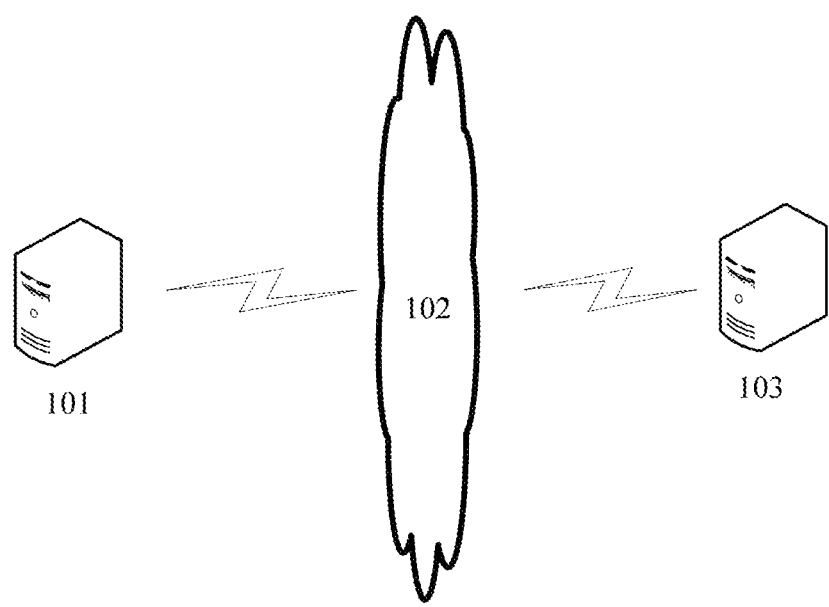
FIG. 1 is an exemplary system architecture diagram in which the present disclosure may be applied.

FIG. 1 shows an exemplary architecture of a system 100 which may be used by an information processing method or an information processing apparatus according to the embodiments of the present disclosure.

As shown in FIG. 1, the system architecture 100 may include a data storage server 101, a network 102 and an image processing server 103. The network 102 serves as a medium providing a communication link between the data storage server 101 and the image processing server 103. The network 102 may include various types of connections, such as wired or wireless transmission links, or optical fibers.

The data storage server 101 may be a server providing various services, for example, a server for storing an image of a human face and facial region information for indicating the facial region of the image. Alternatively, the data storage server may have a facial detection function, and the facial region information may be information generated through performing a facial detection by the data storage server 101 on the image.

The image processing server 103 may be a server providing various services, for example, acquiring a to-be-detected image and facial region information for indicating a facial region of the to-be-detected image, performing a corresponding detection operation based on the to-be-detected image and the facial region information, and generating corresponding information such as information for indicating a category of each pixel point included in the face image extracted from the to-be-detected image.

It should be noted that the information generating method according to the embodiments of the present disclosure is generally executed by the server 103. Accordingly, an information generating apparatus is generally installed on the server 103.

It should be pointed out that if the to-be-detected image and the facial region information for indicating the facial region of the to-be=detected image which are obtained by the image processing server are pre-stored locally on the image processing server 103, the system architecture may not include the data storage server 101.

It should be understood that the numbers of the storage server, the network and the image processing server in FIG. 1 are merely illustrative. Any number of the storage server, the network and the image processing server may be provided based on the actual requirements.

Figure 2:
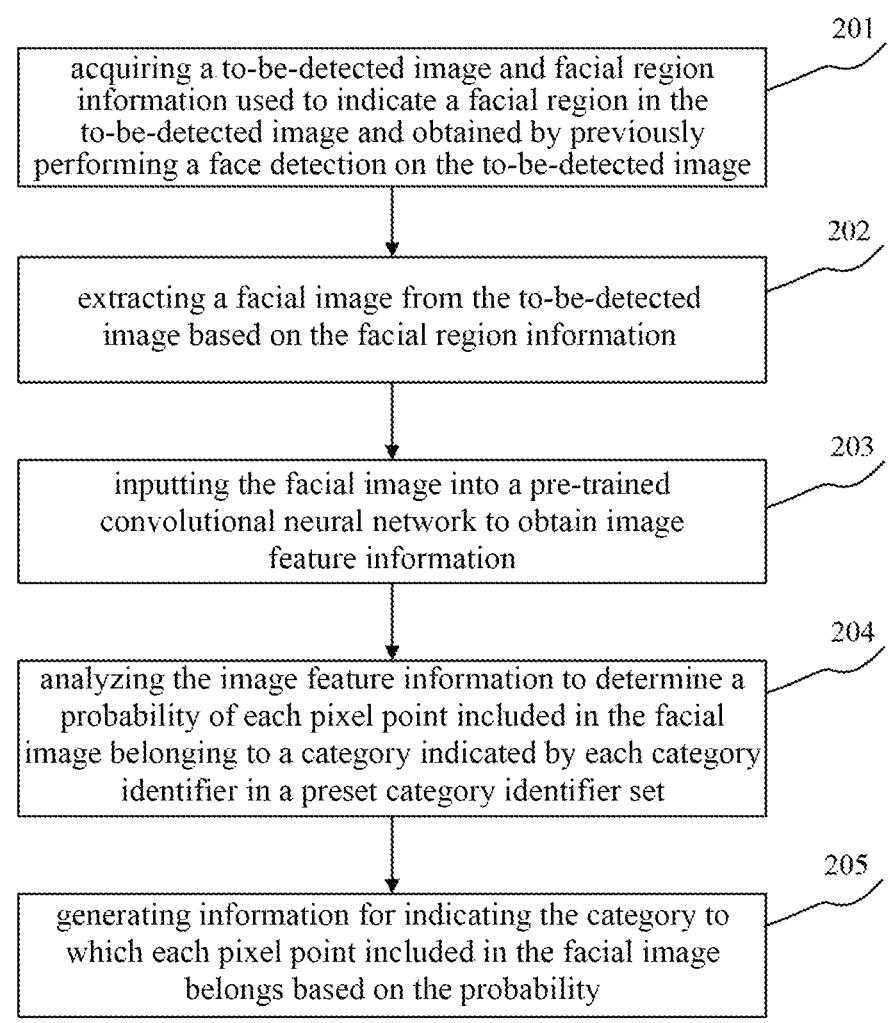
FIG. 2 is a flowchart of an embodiment of a method for generating information according to the present disclosure.

Further referring to FIG. 2, which illustrates a flow 200 of an embodiment of a method for generating information according to the present disclosure. The flow 200 of the method for generating information includes steps 201 to 205.

Step 201 includes acquiring a to-be-detected image and facial region information used to indicate a facial region in the to-be-detected image and obtained by previously performing a face detection on the to-be-detected image.

In this embodiment, an electronic device (for example, the image processing server 103 as illustrated in FIG. 1) on which the method for generating information is performed may acquire the to-be-detected image and the facial region information used to indicate the facial region in the to-be-detected image and obtained by previously performing the face detection on the to-be-detected image from the connected data storage server (for example, the data storage server 101 as illustrated in FIG. 1) by means of a wired connection or a wireless connection. Clearly, if the to-be-detected image and the facial region information are locally pre-stored in the electronic device, the electronic device may locally acquire the to-be-detected image and the facial region information.

It should be noted that the facial region may be a facial region having any shape (e.g., a circular shape and a rectangular shape). Here, when the facial region in the to-be-detected image is a circular region, the facial region information, for example, may include a coordinate of a center point of the facial region and a radius of the facial region. When the facial region in the to-be-detected image is a rectangular region, the facial region information, for example, may include a coordinate of at least one vertex, a height and a width of the facial region, etc.

It should be pointed out that the to-be-detected image and the facial region information may be actively acquired by the electronic device, and may alternatively be passively acquired by the electronic device (for example, the to-be-detected image and the facial region information are sent to the electronic device by the data storage server), which is not limited in this embodiment.

In some alternative implementations of this embodiment, the electronic device may alternatively acquire the to-be-detected image and the facial region information from a connected terminal device. It should be noted that sources of the to-be-detected image and the facial region information are not limited in this embodiment.

Step 202 includes extracting a facial image from the to-be-detected image based on the facial region information.

In this embodiment, after acquiring the to-be-detected image and the facial region information, the electronic device may extract the facial image from the to-be-detected image based on the facial region information. As an example, the electronic device may capture the facial region indicated by the facial region information in the to-be-detected image to obtain the facial image.

Step 203 includes inputting the facial image into a pre-trained convolutional neural network to obtain image feature information.

In this embodiment, after obtaining the facial image, the electronic device may input the facial image into the pre-trained convolutional neural network to obtain the image feature information. The convolutional neural network may be used to extract an image feature. Here, the image feature information may be information for representing the image feature. The image feature may be various basic elements (e.g., a color, a line, and a texture) of the image. In practice, the convolutional neural network (CNN) is a feedforward neural network, and an artificial neuron of the neural network may respond to a part of surrounding cells within the coverage range. Thus, the convolutional neural network has excellent performance in image processing. Therefore, the convolutional neural network may be used to extract the image feature information.

It should be noted that the convolutional neural network may be obtained by performing a supervised training on the existing deep convolutional neural network (e.g., DenseBox, VGGNet, ResNet, and SegNet) using a machine learning method and a training sample. It should be noted that the convolutional neural network may include at least one convolutional layer and at least one deconvolutional layer. The convolutional layer may be used to perform a downsampling operation on the inputted information. The deconvolutional layer may be used to perform an upsampling operation on the inputted information. In addition, the convolutional neural network may also perform a nonlinear calculation on the information using various nonlinear activation functions (e.g., a ReLU (Rectified Linear Units) function, and a Sigmoid function).

Step 204 includes analyzing the image feature information to determine a probability of each pixel point included in the facial image belonging to a category indicated by each category identifier in a preset category identifier set.

In this embodiment, the electronic device may analyze the image feature information in various ways to determine the probability of each pixel point included in the facial image belonging to the category indicated by each category identifier in the category identifier set. As an example, the electronic device may locally pre-store or a server remotely communicated with the electronic device may pre-store a correspondence table for a correspondence between a large amount of image feature information and the probability of each pixel point belonging to the category indicated by each category identifier in the category identifier set. The electronic device may query, in the correspondence table, the probability of each pixel point that matching the image feature information of the facial image and belonging to the category indicated by each category identifier in the category identifier set It should be noted that, the category indicated by the category identifier in the category identifier set may be, for example, left eye, right eye, upper lip, lower lip, background, hair, left eyebrow, or right eyebrow. In addition, the category identifier in the category identifier set may be represented by a character such as a letter or a numeral.

In some alternative implementations of this embodiment, the electronic device may input the image feature information of the facial image into a pre-trained first probability calculation model, to obtain the probability of each pixel point included in the facial image belonging to the category indicated by each category identifier in the category identifier set. As an example, the first probability calculation model may be the correspondence table pre-established by a technician based on a large number of statistical calculations and used to represent the correspondence between the image feature information and the probability of each pixel point belonging to the category indicated by each category identifier in the category identifier set. The first probability calculation model may alternatively be obtained by training using a classification model such as a Naive Bayesian Model (NBM) and a Support Vector Machine (SVM), or using a classification function (e.g., a softmax function).

Step 205 includes generating, based on the probability, information for indicating the category to which each pixel point included in the facial image belongs.

In this embodiment, after determining the probability of each pixel included in the facial image belonging to the category indicated by each category identifier in the category identifier set, the electronic device may generate the information for indicating the category to which each pixel point included in the facial image belongs based on the probability. As an example, for each pixel point included in the facial image, the electronic device may determine a category indicated by a category identifier corresponding to a maximum probability corresponding to the pixel point as a category to which the pixel point belongs. Then, the electronic device may generate correspondence information. The correspondence information may include a coordinate of each pixel point in the facial image and a category identifier corresponding to the coordinate (i.e., the category identifier of the category to which the pixel point belongs)

Alternatively, each category identifier in the category identifier set may have a corresponding category name. After determining the category to which each pixel included in the facial image belongs, the electronic device may further generate a correspondence table including the following information: the coordinate of each pixel point in the facial image and a category name corresponding to the coordinate (i.e., a category name of the category to which the pixel point belongs).

In some alternative implementations of this embodiment, after generating the information for indicating the category to which each pixel point included in the facial image belongs, the electronic device may further output the information. For example, the information is outputted to the connected facial recognition system.

In some alternative implementations of this embodiment, after generating the information for indicating the category to which each pixel point included in the facial image belongs, the electronic device may further store the information. For example, the information is stored locally in the electronic device or stored in the server remotely communicated with the electronic device.

Figure 3:
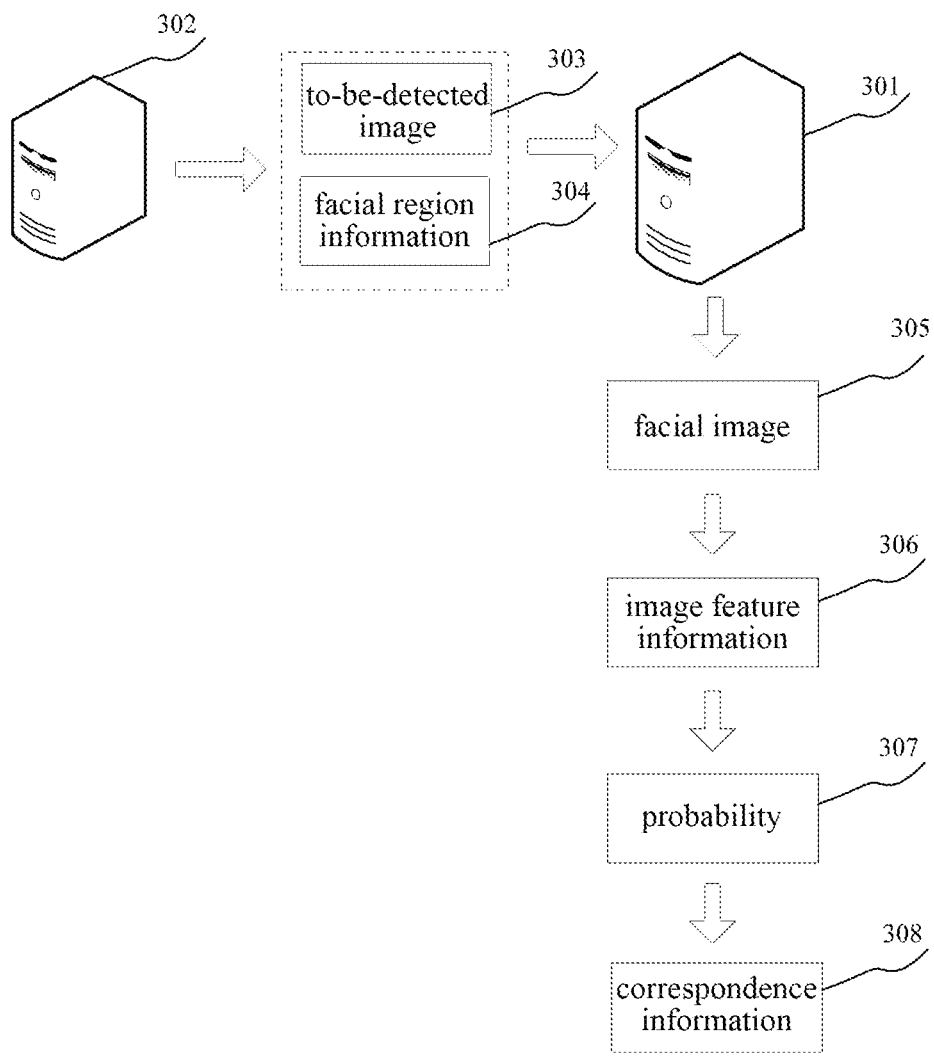
FIG. 3 is a schematic diagram of an application scenario of the method for generating information according to the present disclosure.

Further referring to FIG. 3, which is a schematic diagram of an application scenario of the method for generating information according to this embodiment. In the application scenario of FIG. 3, an image processing server 301 may acquire, from a connected data storage server 302, an to-be-detected image 303 and facial region information 304 used to indicate a facial region in the to-be-detected image 303 and obtained by previously performing a face detection on the to-be-detected image 303. Then, the image processing server 301 may capture the facial region indicated by the facial region information 304 in the to-be-detected image 303 to obtain the facial image 305. Next, the image processing server 301 may input the facial image 305 into a pre-trained convolutional neural network to obtain the image feature information 306. Then, the image processing server 301 may analyze the image feature information 306 to determine a probability 307 of each pixel point included in the facial image 305 belonging to a category indicated by each category identifier in a preset category identifier set. Finally, the image processing server 301 may generate correspondence information 308 based on the probability 307. The correspondence information 308 may include the coordinate of each pixel point included in the facial image 305 and the category identifier corresponding to the coordinate, i.e., the category identifier of the category to which the pixel point belongs.

According to the method provided in the above embodiment of the present disclosure, the image feature information of the facial image is determined by effectively using the pre-trained convolutional neural network, and the probability of each pixel point included in the facial image belonging to the category indicated by each category identifier in the category identifier set is determined based on the image feature information, thereby implementing the generation of the information full of pertinence.

Moreover, the detection range may be narrowed by extracting the facial image from the to-be-detected image, thereby improving the image detection efficiency. In addition, the generated information for indicating the category to which each pixel point included in the facial image belongs may be used in the facial recognition process. Based on the category (e.g., left eye, right eye, upper lip, and lower lip) to which each pixel point belongs, different parts of the human face can be quickly recognized, which may be helpful to improve the facial recognition efficiency.

Figure 4:
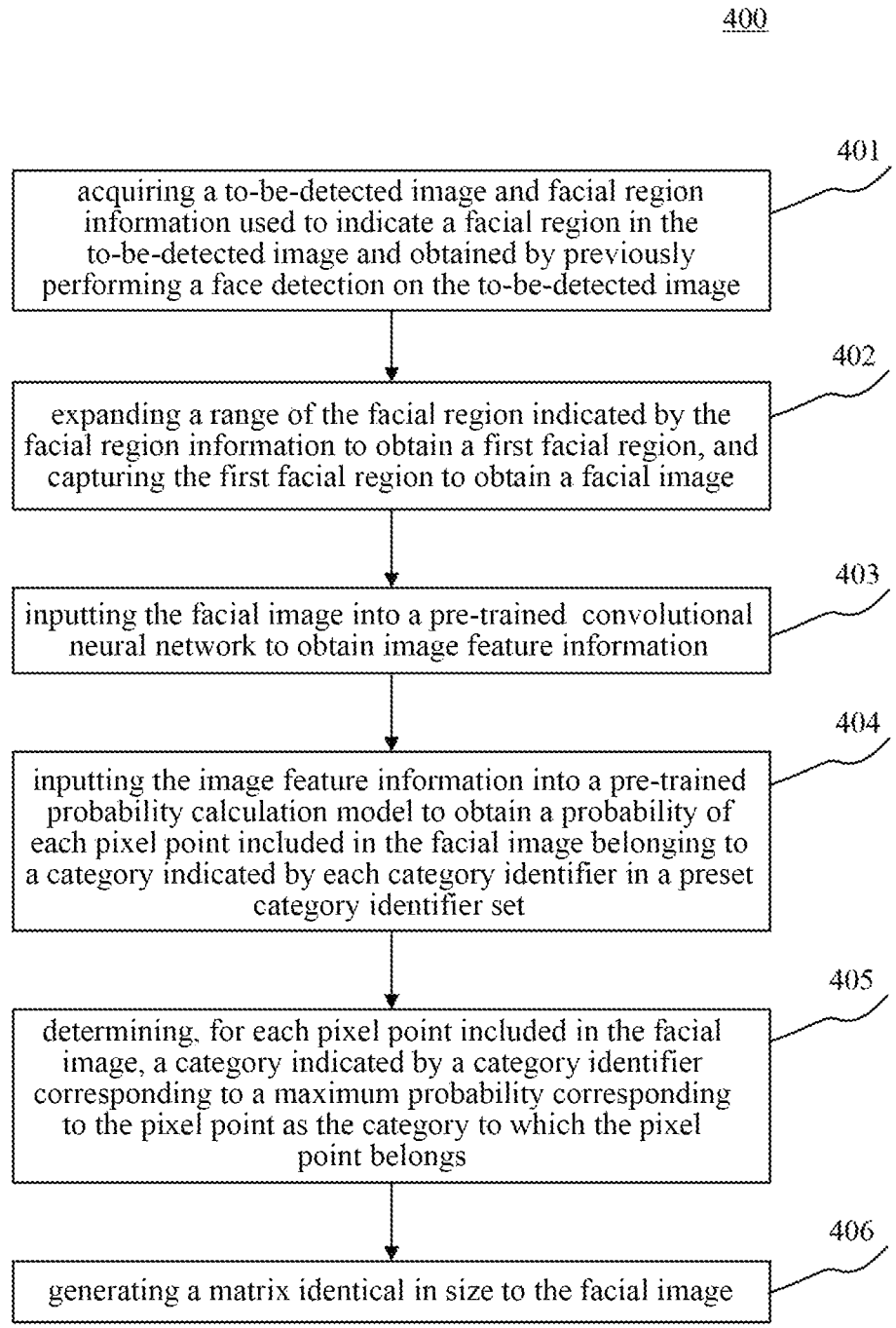
FIG. 4 is a flowchart of another embodiment of the method for generating information according to the present disclosure.

Further referring to FIG. 4, which illustrates a flow 400 of another embodiment of the method for generating information. The flow 400 of the method for generating information includes the following steps 401 to 406.

Step 401 includes acquiring a to-be-detected image and facial region information used to indicate a facial region in the to-be-detected image and obtained by previously performing a face detection on the to-be-detected image.

In this embodiment, an electronic device (for example, the image processing server 103 as illustrated in FIG. 1) on which the method for generating information is performed may acquire the to-be-detected image and the facial region information used to indicate the facial region in the to-be-detected image and obtained by previously performing the face detection on the to-be-detected image from the connected data storage server (for example, the data storage server 101 as illustrated in FIG. 1) by means of a wired connection or a wireless connection. Clearly, if the to-be-detected image and the facial region information are locally pre-stored in the electronic device, the electronic device may locally acquire the to-be-detected image and the facial region information. It should be noted that the facial region may be a rectangular region.

Step 402 includes expanding a range of the facial region indicated by the facial region information to obtain a first facial region, and capturing the first facial region to obtain a facial image.

In this embodiment, after acquiring the to-be-detected image and the facial region information, the electronic device may expand the range of the facial region indicated by the facial region information to obtain the first facial region. The electronic device may capture the first facial region to obtain the facial image.

In this embodiment, the electronic device may expand the height and the width of the facial region indicated by the facial region information by a preset multiple or increase the height and the width by a preset numerical value, and use the expanded facial region as the first facial region. Here, the preset multiple may be a numerical value such as 1. Moreover, the height and the width may correspond to the same preset numerical value, or correspond to different preset numerical values. For example, the preset numerical value corresponding to the height is the same numerical value as the height. The preset numerical value corresponding to the width is the same numerical value as the height. The preset multiple and the preset numerical value may be modified according to actual needs, which is not limited in this embodiment.

Step 403 includes inputting the facial image into a pre-trained convolutional neural network to obtain image feature information.

In this embodiment, after obtaining the facial image, the electronic device may input the facial image into the pre-trained convolutional neural network to obtain the image feature information. The convolutional neural network may be used to extract an image feature. Here, the image feature information may be information for representing the image feature. The image feature may be various basic elements (e.g., a color, a line, and a texture) of the image.

It should be noted that the convolutional neural network, for example, may be a Fully Convolutional Network (FCN). For example, the convolutional neural network may include 5 convolutional layers and 5 deconvolutional layers. The convolutional layers may be used to perform a downsampling operation on the inputted information, and the deconvolutional layers may be used to perform an upsampling operation on the inputted information. Here, the convolutional neural network may perform a nonlinear calculation on the information using a nonlinear activation function (e.g., a ReLU function and a Sigmoid function).

Step 404 includes inputting the image feature information into a pre-trained probability calculation model to obtain a probability of each pixel point included in the facial image belonging to a category indicated by each category identifier in a preset category identifier set.

In this embodiment, after obtaining the image feature information of the facial image, the electronic device may input the image feature information into the pre-trained probability calculation model to obtain the probability of each pixel point included in the facial image belonging to the category indicated by each category identifier in the category identifier set. The probability calculation model may be used to represent a correspondence between the image feature information of the image including a human face and the probability of each pixel point belonging to the category indicated by each category identifier in the category identifier set.

Here, the category indicated by the category identifier in the category identifier set, for example, may be left eye, right eye, upper lip, lower lip, background, hair, left eyebrow, or right eyebrow. In addition, the category identifier in the category identifier set may be represented by a character such as a letter or a numeral.

It should be noted that the probability calculation model may be a fully connected layer (FC) in a neural network. The fully convolutional network and the fully connected layer may constitute the whole convolutional neural network. The electronic device may simultaneously train the convolutional neural network, that is, simultaneously train the fully convolutional network and the fully connected layer.

Specifically, the electronic device may train and obtain the convolutional neural network and the probability calculation model through following training.

First, the electronic device may extract a preset training sample including a sample image displaying the human face and an annotation of the sample image. The annotation may include a data marker for representing whether each pixel point in the sample image belongs to the category indicated by each category identifier in the category identifier set. Here, the number of data markers corresponding to each pixel point is the same as the number of category identifiers in the category identifier set. It should be noted that the data markers may include 0 and 1. 0 may represent "not belonging to," and 1 may represent "belonging to." As an example, for any one of the pixel points and any one of the category identifiers, if a data marker associated with the pixel point and the category identifier is 0, the data marker may represent that the pixel point does not belong to the category indicated by the category identifier. It should be pointed out that the annotation may be represented by a matrix.

Then, the electronic device may train and obtain the convolutional neural network and the probability calculation model based on the training sample, a preset classification loss function and a back propagation algorithm by using a machine learning method. The classification loss function may be used to represent a degree of difference between the probability outputted by the probability calculation model and the data marker included in the annotation. The classification loss function may be various loss functions (e.g., a Hinge Loss function or a Softmax Loss function) for classification. During the training process, the classification loss function may restrict a means and a direction of modifying a convolution kernel. The purpose of training is to minimize the value of the classification loss function. Therefore, parameters of the fully convolutional network and fully connected layer obtained by training are parameters corresponding to a minimum value of the classification loss function.

It should be noted that the back propagation algorithm (BP algorithm) may also be referred to as an error back propagation (BP) algorithm or an error inverse propagation algorithm. The BP algorithm is composed of forward propagation of a signal and backward propagation of an error during the learning process. In the feedforward network, the input signal is inputted through the input layer and outputted by the output layer through a calculation of a hidden layer. When the outputted value is compared with a mark value, if there is an error, the error 25 is back propagated from the output layer to the input layer. In this process, a gradient descent algorithm (e.g., a stochastic gradient descent algorithm) may be used to adjust a neuron weight (e.g., a parameter of the convolution kernel in the convolutional layer). Here, the classification loss function may be used to represent the error between the outputted value and the mark value.

Step 405 includes determining, for each pixel point included in the facial image, a category indicated by a category identifier corresponding to a maximum probability corresponding to the pixel point as the category to which the pixel point belongs.

In this embodiment, for each pixel point included in the facial image, the electronic device may determine the category indicated by the category identifier corresponding to the maximum probability that corresponds to the pixel point and is determined in step 404 as the category to which this pixel point belongs. As an example, for a certain pixel point P, assuming that the category identifier set includes category identifiers A, B, and C, the probability of the pixel point P belonging to the category indicated by the category identifier A is 0.6, the probability of the pixel point P belonging to the category indicated by the category identifier B is 0.7, and the probability of the pixel point P belonging to the category indicated by the category identifier C is 0.8, and the maximum probability corresponding to the pixel point P is 0.8. The electronic device may determine the category indicated by the category identifier C as the category to which the pixel point P belongs.

Step 406 includes generating a matrix identical in size to the facial image.

In this embodiment, after determining the category to which the each pixel point included in the facial image belongs, the electronic device may generate the matrix identical in size to the facial image. Here, each element in the matrix may be the category identifier of the category to which the pixel point whose position in the facial image is the same as the position of the element in the matrix belongs.

As may be seen from FIG. 4, compared with the embodiment corresponding to FIG. 2, the flow 400 of the method for generating information in this embodiment emphasizes the step of expanding the range of the facial region in the to-be-detected image, the step of determining the probability of each pixel point included in the facial image belonging to the category indicated by each category identifier in the category identifier set using the pre-trained probability calculation model, and the step of generating the matrix identical in size to the facial image. Therefore, in the solution described in this embodiment, the coverage area of the facial image may be expanded by expanding the range of the facial region, so that the facial image can include facial parts as many as possible. By determining the probability using the probability calculation model, the accuracy of the probability may be improved, and then the effectiveness of the generated information may be improved.

Figure 5:
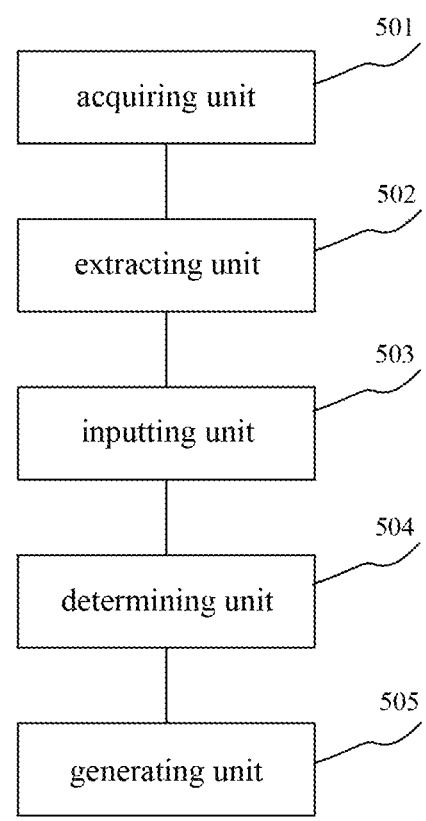
FIG. 5 is a schematic structural diagram of an embodiment of an apparatus for generating information according to the present disclosure.

Further referring to FIG. 5, as an implementation of the method shown in each of the above-mentioned figures, the present disclosure provides an embodiment of an apparatus for generating information. The embodiment of this apparatus corresponds to the embodiment of the method as illustrated in FIG. 2, and this apparatus may be applied in various electronic devices.

As shown in FIG. 5, the apparatus 500 for generating information in this embodiment includes: an acquiring unit 501, an extracting unit 502, an inputting unit 503, a determining unit 504 and a generating unit 505. The acquiring unit 501 is configured to acquire a to-be-detected image and facial region information used to indicate a facial region in the to-be-detected image and obtained by previously performing a face detection on the to-be-detected image. The extracting unit 502 is configured to extract a facial image from the to-be-detected image based on the facial region information. The inputting unit 503 is configured to input the facial image into a pre-trained convolutional neural network to obtain image feature information, the convolutional neural network being used to extract an image feature. The determining unit 504 is configured to analyze the image feature information to determine a probability of each pixel point included in the facial image belonging to a category indicated by each category identifier in a preset category identifier set. The generating unit 505 is configured to generate information for indicating the category to which each pixel point belongs based on the probability.

In this embodiment, for specific processes of the acquiring unit 501, the extracting unit 502, the inputting unit 503, the determining unit 504 and the generating unit 505 in the apparatus 500 for generating information, and their technical effects, reference may be made to relative descriptions of step 201, step 202, step 203, step 204 and step 205 in the corresponding embodiment of FIG. 2 respectively, which will not be repeatedly described here.

In some alternative implementations of this embodiment, the determining unit 504 may further includes: an inputting subunit (not shown). The inputting subunit is configured to input the image feature information into a pre-trained probability calculation model to obtain the probability of each pixel point included in the facial image belonging to the category indicated by each category identifier in the category identifier set. The probability calculation model is used to represent a correspondence between the image feature information of the image including a human face and the probability of the pixel point belonging to each category identifier in the category identifier set.

In some alternative implementations of this embodiment, the convolutional neural network and the probability calculation model are trained and obtained through following training: extracting a preset training sample including a sample image displaying the human face and an annotation of the sample image, where the annotation includes a data marker for representing whether each pixel point in the sample image belongs to each category identifier in the category identifier set; and training and obtaining the convolutional neural network and the probability calculation model based on the training sample, a preset classification loss function and a back propagation algorithm by using a machine learning method, where the classification loss function is used to represent a degree of difference between the probability outputted by the probability calculation model and the data marker included in the annotation.

In some alternative implementations of this embodiment, the convolutional neural network may include 5 convolutional layers and 5 deconvolutional layers. The convolutional layers are used to perform a downsampling operation on the inputted information, and the deconvolutional layers are used to perform an upsampling operation on the inputted information.

In some alternative implementations of this embodiment, the generating unit 505 may further include: a determining subunit (not shown), configured to determine, for each pixel point included in the facial image, a category indicated by a category identifier corresponding to a maximum probability corresponding to the pixel point as the category to which the pixel point belongs; and a generating subunit (not shown), configured to generate a matrix identical in size to the facial image. Each element in the matrix may be the category identifier of the category to which the pixel point whose position in the facial image is the same as the position of the element in the matrix belongs.

In some alternative implementations of this embodiment, the extracting unit 502 may further include: an expanding subunit (not shown), configured to expand a range of the facial region indicated by the facial region information to obtain a first facial region; and a capturing subunit (not shown), configured to capture the first facial region to obtain the facial image.

In some alternative implementations of this embodiment, the facial region may be a rectangular region. The expanding subunit may include an expanding module (not shown), configured to expand a height and a width of the facial region indicated by the facial region information by a preset multiple or increase the height and the width by a preset numerical value.

In the apparatus provided by the embodiment of the present disclosure, the image feature information of the facial image is determined by effectively using the pre-trained convolutional neural network, and the probability of each pixel point included in the facial image belonging to the category indicated by each category identifier in the category identifier set is determined based on the image feature information, thereby implementing the generation of the information full of pertinence.

Moreover, the detection range may be narrowed by extracting the facial image from the to-be-detected image, thereby improving the image detection efficiency. In addition, the generated information for indicating the category to which each pixel point included in the facial image belongs may be used in the facial recognition process. Based on the category (e.g., left eye, right eye, upper lip, and lower lip) to which each pixel point belongs, different parts of the human face can be quickly recognized, which may be helpful to improve the facial recognition efficiency.

Figure 6:
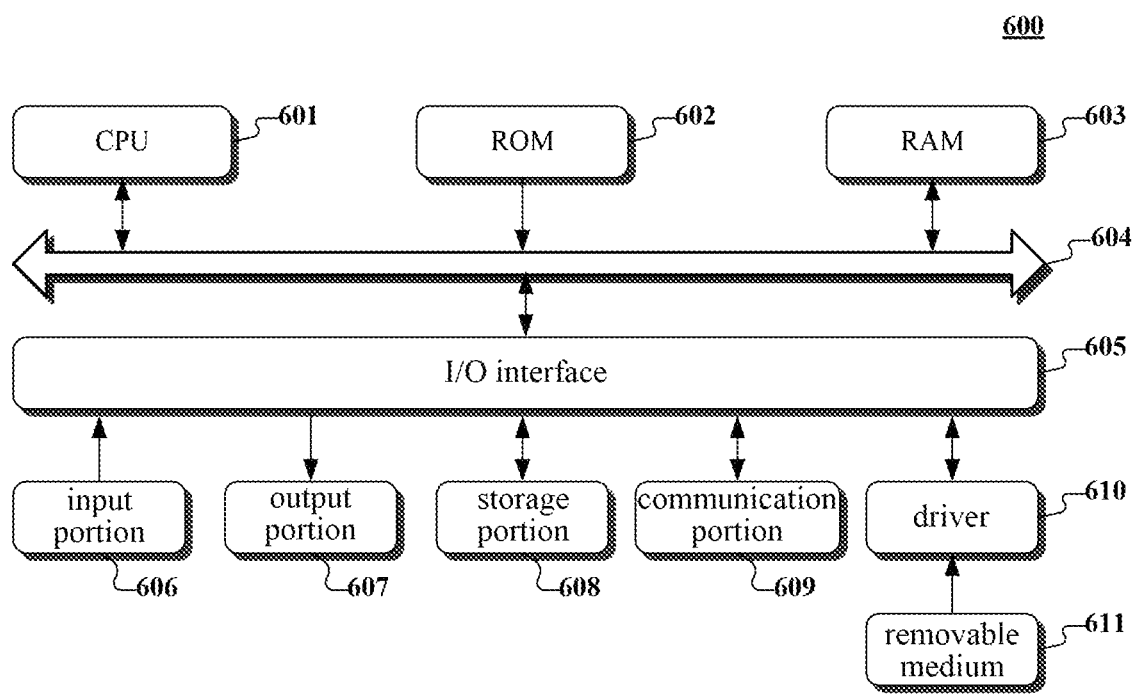
FIG. 6 is a schematic structural diagram of a computer system adapted to implement an electronic device according to embodiments of the present disclosure.

Referring to FIG. 6, a schematic structural diagram of a computer system 600 adapted to implement an electronic device of the embodiments of the present disclosure is shown. The electronic device shown in FIG. 6 only is an example and should not be a limitation of the function and range of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is loaded in a computer-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instruction.

The units or modules involved in the embodiments of the present disclosure may be implemented by means of software or hardware. The described units or modules may also be provided in a processor, for example, described as: a processor, comprising an obtaining unit, an extracting unit, an input unit, a determining unit and a generating unit, where the names of these units or modules do not in some cases constitute a limitation to such units or modules themselves. For example, the obtaining unit may also be described as "a unit for obtaining a to-be-detected image and facial region information used to indicate a facial region in the to-be-detected image and obtained by previously performing a face detection on the to-be-detected image."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a to-be-detected image and facial region information used to indicate a facial region in the to-be-detected image and obtained by previously performing a face detection on the to-be-detected image; extract a facial image from the to-be-detected image based on the facial region information; input the facial image into a pre-trained convolutional neural network to obtain image feature information, the convolutional neural network being used to extract an image feature; analyze the image feature information to determine a probability of each pixel point included in the facial image belonging to a category indicated by each category identifier in a preset category identifier set; and generate information for indicating the category to which each pixel point belongs based on the probability.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, comprising:
acquiring a to-be-detected image and facial region information used to indicate a facial region in the to-be-detected image and obtained by previously performing a face detection on the to-be-detected image, the facial region information comprising a coordinate of a center point or a vertex of a facial region, and a height and a width of the facial region;
extracting a facial image from the to-be-detected image based on the facial region information;
inputting the facial image into a pre-trained convolutional neural network to obtain image feature information, the convolutional neural network being used to extract an image feature;
analyzing the image feature information to determine a probability that each pixel point included in the facial image belongs to a category indicated by each category identifier in a preset category identifier set, based on a correspondence table storing a correspondence between the image feature information and the probability that each pixel point belongs to the category indicated by each category identifier in the preset category identifier set; and
generating information for indicating the category to which each pixel point belongs based on the probability.

2. The method according to claim 1, wherein the analyzing the image feature information to determine a probability that each pixel point included in the facial image belongs to a category indicated by each category identifier in a preset category identifier set comprises:
inputting the image feature information into a pre-trained probability calculation model to obtain the probability of each pixel point comprised in the facial image belonging to the category indicated by each category identifier in the category identifier set, wherein the probability calculation model is used to represent a correspondence between the image feature information of the image comprising a human face and the probability of the pixel point belonging to each category identifier in the category identifier set.

3. The method according to claim 2, wherein the convolutional neural network and the probability calculation model are trained and obtained through following training:
extracting a preset training sample comprising a sample image displaying the human face and an annotation of the sample image, wherein the annotation comprises a data marker for representing whether each pixel point in the sample image belongs to each category identifier in the category identifier set; and
training and obtaining the convolutional neural network and the probability calculation model based on the training sample, a preset classification loss function and a back propagation algorithm by using a machine learning method, wherein the classification loss function is used to represent a degree of difference between the probability outputted by the probability calculation model and the data marker comprised in the annotation.

4. The method according to claim 1, wherein the convolutional neural network comprises 5 convolutional layers and 5 deconvolutional layers, the convolutional layers are used to perform a downsampling operation on the inputted information, and the deconvolutional layers are used to perform an upsampling operation on the inputted information.

5. The method according to claim 1, wherein the generating information for indicating the category to which each pixel point belongs based on the probability comprises:
   determining, for each pixel point comprised in the facial image, a category indicated by a category identifier corresponding to a maximum probability corresponding to the pixel point as the category to which the pixel point belongs; and
   generating a matrix identical in size to the facial image, wherein each element in the matrix is a category identifier of a category to which a pixel point whose position in the facial image is the same as a position of the element in the matrix belongs.

6. The method according to claim 1, wherein the facial region information comprises the coordinate of the vertex of the facial region, and the height and the width of the facial region, in response to the facial region being a rectangular region; or
   the facial region information comprises the coordinate of the center point of the facial region, and the height and the width of the facial region, in response to the facial region being a circular region, the height and the width of the facial region being a diameter of the circular region.

7. The method according to claim 1, wherein the extracting a facial image from the to-be-detected image based on the facial region information comprises:
   expanding a range of the facial region indicated by the facial region information to obtain a first facial region; and
   capturing the first facial region to obtain the facial image.

8. The method according to claim 7, wherein the facial region is a rectangular region; and
   the expanding a range of the facial region indicated by the facial region information comprises:
   expanding the height and the width of the facial region indicated by the facial region information by a preset multiple or increasing the height and the width by a preset numerical value.

9. An apparatus for generating information, comprising:
   at least one processor; and
   a memory storing instructions, the instructions when executed by the at least one processor, cause the at least one processor to perform operations, the operations comprising:
      acquiring a to-be-detected image and facial region information used to indicate a facial region in the to-be-detected image and obtained by previously performing a face detection on the to-be-detected image, the facial region information comprising a coordinate of a center point or a vertex of a facial region, and a height and a width of the facial region;
      extracting a facial image from the to-be-detected image based on the facial region information;
      inputting the facial image into a pre-trained convolutional neural network to obtain image feature information, the convolutional neural network being used to extract an image feature;
      analyzing the image feature information to determine a probability that each pixel point included in the facial image belongs to a category indicated by each category identifier in a, based on a correspondence table storing a correspondence between the image feature information and the probability that each pixel point belongs to the category indicated by each category identifier in the preset category identifier set; and
      generating information for indicating the category to which each pixel point belongs based on the probability.

10. The apparatus according to claim 9, wherein the analyzing the image feature information to determine a probability that each pixel point included in the facial image belongs to a category indicated by each category identifier in a preset category identifier set comprises:
    inputting the image feature information into a pre-trained probability calculation model to obtain the probability of each pixel point comprised in the facial image belonging to the category indicated by each category identifier in the category identifier set, wherein the probability calculation model is used to represent a correspondence between the image feature information of the image comprising a human face and the probability of the pixel point belonging to each category identifier in the category identifier set.

11. The apparatus according to claim 10, wherein the convolutional neural network and the probability calculation model are trained and obtained through following training:
    extracting a preset training sample comprising a sample image displaying the human face and an annotation of the sample image, wherein the annotation comprises a data marker for representing whether each pixel point in the sample image belongs to each category identifier in the preset category identifier set; and
    training and obtaining the convolutional neural network and the probability calculation model based on the training sample, a preset classification loss function and a back propagation algorithm by using a machine learning method, wherein the classification loss function is used to represent a degree of difference between the probability outputted by the probability calculation model and the data marker comprised in the annotation.

12. The apparatus according to claim 9, wherein the convolutional neural network comprises 5 convolutional layers and 5 deconvolutional layers, the convolutional layers are used to perform a downsampling operation on the inputted information, and the deconvolutional layers are used to perform an upsampling operation on the inputted information.

13. The apparatus according to claim 9, wherein the generating information for indicating the category to which each pixel point belongs based on the probability comprises:
    determining, for each pixel point comprised in the facial image, a category indicated by a category identifier corresponding to a maximum probability corresponding to the pixel point as the category to which the pixel point belongs; and
    generating a matrix identical in size to the facial image, wherein each element in the matrix is a category identifier of a category to which a pixel point whose position in the facial image is the same as a position of the element in the matrix belongs.

14. The apparatus according to claim 9, wherein the extracting a facial image from the to-be-detected image based on the facial region information comprises:
    expanding a range of the facial region indicated by the facial region information to obtain a first facial region; and
    capturing the first facial region to obtain the facial image.

15. The apparatus according to claim 14, wherein the facial region is a rectangular region; and the expanding a range of the facial region indicated by the facial region information comprises:

expanding the height and the width of the facial region indicated by the facial region information by a preset multiple or increase the height and the width by a preset numerical value.

16. A non-transitory computer storage medium, storing a computer program, wherein the program, when executed by a processor, cause the processor to perform operations, the operations comprising:

acquiring a to-be-detected image and facial region information used to indicate a facial region in the to-be-detected image and obtained by previously performing a face detection on the to-be-detected image, the facial region information comprising a coordinate of a center point or a vertex of a facial region, and a height and a width of the facial region;

extracting a facial image from the to-be-detected image based on the facial region information;

inputting the facial image into a pre-trained convolutional neural network to obtain image feature information, the convolutional neural network being used to extract an image feature;

analyzing the image feature information to determine a probability that each pixel point included in the facial image belongs to a category indicated by each category identifier in a preset category identifier set, based on a correspondence table storing a correspondence between the image feature information and the probability that each pixel point belongs to the category indicated by each category identifier in the preset category identifier set; and generating information for indicating the category to which each pixel point belongs based on the probability.

* * * * *